(12) United States Patent
Huang et al.

(10) Patent No.: US 10,001,868 B2
(45) Date of Patent: Jun. 19, 2018

(54) INFORMATION PROCESSING METHOD, INFORMATION PROCESSING DEVICE, AND ELECTRONIC APPARATUS

(71) Applicant: Lenovo (Beijing) Co., Ltd., Beijing (CN)

(72) Inventors: Huakun Huang, Beijing (CN); Zanxuan Fu, Beijing (CN); Qian Wang, Beijing (CN); Jinping Yang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 155 days.

(21) Appl. No.: 14/849,793

(22) Filed: Sep. 10, 2015

(65) Prior Publication Data

US 2016/0259468 A1 Sep. 8, 2016

(30) Foreign Application Priority Data

Mar. 6, 2015 (CN) .......................... 2015 1 0101211

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

2015/0234493 A1* 8/2015 Parivar .................. G06F 3/044
345/174

* cited by examiner

*Primary Examiner* — Carolyn R Edwards
(74) *Attorney, Agent, or Firm* — Harness, Dickey & Pierce, P.L.C.

(57) ABSTRACT

An information processing method, an information processing device and an electronic apparatus with a touch screen are provided. The method includes: obtaining a first parameter value of the touch screen at instant T1; obtaining a second parameter value of the touch screen at instant T2 after instant T1, where an instant T3 is defined between instant T1 and instant T2, and the instant T3 corresponds to a third parameter value, where the third parameter value is greater than or equal to the first parameter value and any one of parameter values corresponding to instants between instant T1 and instant T2; and generating an operation response instruction in a case that the second parameter value is greater than a preset parameter value and a correspondence among the first parameter value, the second parameter value and the third parameter value meets a preset condition.

12 Claims, 4 Drawing Sheets

INFORMATION PROCESSING METHOD, INFORMATION PROCESSING DEVICE, AND ELECTRONIC APPARATUS

CROSS REFERENCE TO RELATED APPLICATIONS

The present application claims the priority to Chinese Patent Application No. 201510101211.9, titled "INFORMATION PROCESSING METHOD, INFORMATION PROCESSING DEVICE AND ELECTRONIC APPARATUS", filed on Mar. 6, 2015 with the State Intellectual Property Office of People's Republic of China, which is incorporated herein by reference in its entirety.

FIELD

The disclosure relates to the technical field of touch control, and in particular to an information processing method, an information processing device and an electronic apparatus.

BACKGROUND

At present, a capacitive touch screen is capable of detecting touch input from user through capacitance induction effect.

According to one technique, during a click operation of a user, a finger gets close to the touch screen and contacts the touch screen, with the finger's movement towards the touch screen, the touch area between the surface of the finger and the touch screen increases to a maximum value, after that, the finger gradually moves away from the touch screen, and finally separates from the surface of the touch screen, thereby achieving a complete click operation. In the technique, only an instant when the finger presses down to contact the touch screen and an instant when the finger is lifted up to separate from the touch screen are detected by the touch screen and reported to an upper control unit, then the control unit may analyze whether the touch operation is finished according to an instant when the finger is lifted off the touch screen, which may result in a low response speed.

SUMMARY

There is provided an information processing method, which includes:

obtaining a first parameter value of a touch screen of an electronic apparatus at instant T1;

obtaining a second parameter value of the touch screen at instant T2 after instant T1, where an instant T3 is defined between instant T1 and instant T2, the instant T3 corresponds to a third parameter value of the touch screen, where the third parameter value is greater than or equal to the first parameter value and any one of parameter values corresponding to instants between instant T1 and instant T2; and generating an operation response instruction in a case that the second parameter value is greater than a first preset parameter value and a correspondence among the first parameter value, the second parameter value and the third parameter value meets a preset condition.

In the above method, optionally, the preset condition includes: a ratio of a first difference between the third parameter value and the second parameter value to a second difference between the third parameter value and the first parameter value is greater than a preset threshold.

In the above method, optionally, in a case that the third parameter value is equal to the first parameter value, the preset condition includes:

a ratio of a first difference between the third parameter value and the second parameter value to the third parameter value is greater than a preset threshold.

In the above method, optionally, if the first difference and the second difference do not meet the preset condition, the method may further include:

generating the operation response instruction, in a case that the second parameter value is less than or equal to a second parameter value.

In the above method, optionally, the parameter value includes a variation value of capacitance, a value of contact area, or a variation value of contact pressure in relation to the touch screen.

There is further provided an information processing device, which includes:

a first sensing unit configured to obtain a first parameter value of a touch screen at instant T1;

a second sensing unit configured to obtain a second parameter value of the touch screen at instant T2 after instant T1, where an instant T3 is defined between instant T1 and instant T2, and the instant T3 corresponds to a third parameter value, where the third parameter value is greater than or equal to the first parameter value and any one of parameter values corresponding to instants between instant T1 and instant T2; and a first generating unit configured to generate an operation response instruction in a case that the second parameter value is greater than a first preset parameter value and a correspondence among the first parameter value, the second parameter value and the third parameter value meets a preset condition.

In the above device, optionally, the preset condition may include: a ratio of a first difference between the third parameter value and the second parameter value to a second difference between the third parameter value and the first parameter value is greater than a preset threshold.

In the above device, optionally, in a case that the third parameter value is equal to the first parameter value, the preset condition includes:

a ratio of a first difference between the third parameter value and the second parameter value to the third parameter value is greater than a preset threshold.

In the above device, optionally, if the first difference and the second difference do not meet the preset condition, the device further includes:

a second generating unit configured to generate the operation response instruction in a case that the second parameter value is less than or equal to a second parameter value.

In the above device, optionally, the parameter value comprises a variation value of capacitance, a value of contact area, or a variation value of contact pressure in relation to the touch screen.

There is also provided an electronic apparatus including a touch screen, which includes:

a sensing unit configured to:

obtain a first parameter value of the touch screen at instant T1;

obtain a second parameter value of the touch screen at instant T2 after instant T1, where an instant T3 is defined between instant T1 and instant T2, the instant T3 corresponds to a third parameter value, the third parameter value is greater than or equal to the first parameter value and any one of parameter values corresponding to instants between instant T1 and instant T2; and a processor configured to generate an operation response instruction in a case that the second parameter value is greater than a first preset parameter value and a correspondence among the first parameter value, the second parameter value and the third parameter value meets a preset condition.

In the above apparatus, optionally, the preset condition includes: a ratio of a first difference between the third parameter value and the second parameter value to a second difference between the third parameter value and the first parameter value is greater than a preset threshold.

In the above apparatus, optionally, in a case that the third parameter value is equal to the first parameter value, the preset condition includes:

a ratio of a first difference between the third parameter value and the second parameter value to the third parameter value is greater than a preset threshold.

In the above apparatus, optionally, if the preset condition is not met, the processor is further configured to generate the operation response instruction in a case that the second parameter value is less than or equal to a second preset parameter value.

In the above apparatus, optionally, the parameter value include a variation value of capacitance, a value of contact area, or a variation value of contact pressure in relation to the touch screen.

BRIEF DESCRIPTION OF THE DRAWINGS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF THE EMBODIMENTS

Technical solutions of the embodiments of the present disclosure will be illustrated completely and clearly in combination with the following drawings of the embodiments of the disclosure. Apparently, the described embodiments are merely a few rather than all of the embodiments of the present disclosure. All other embodiments obtained by persons of ordinary skill in the art based on the embodiment of the present disclosure without creative efforts shall fall within the protection scope of the present disclosure.

Figure 1:
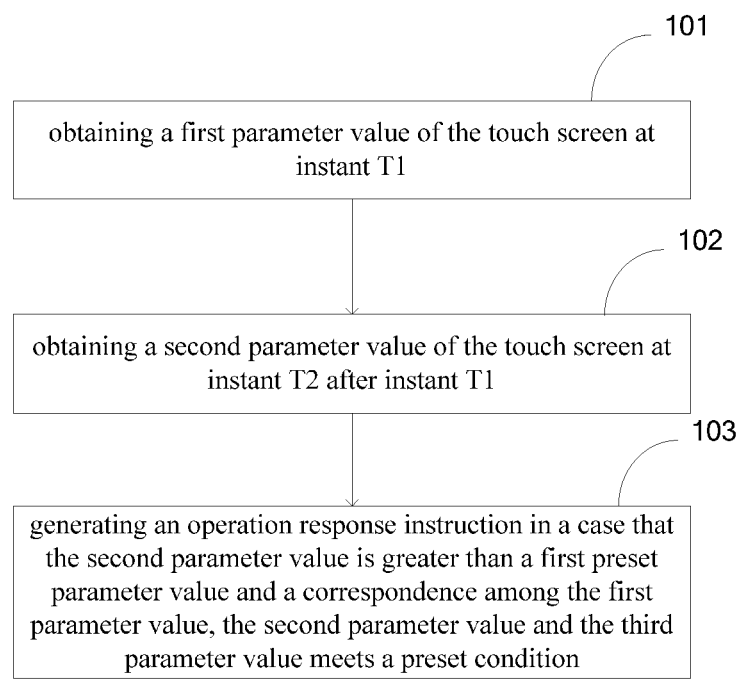
FIG. 1 is a flow chart of an information processing method according to a first embodiment of the disclosure.

FIG. 1 shows a flow chart of an information processing method according to a first embodiment of the disclosure. The method is applicable to an electronic apparatus which may be a terminal apparatus provided with a touch screen such as a mobile phone, a pad, or a laptop. The method may include the following steps 101 to 103.

In step 101, a first parameter value of the touch screen is obtained at instant T1.

That is, during a click operation of a user by finger on the touch screen, the first parameter value of the touch screen is generated at an instant when the finger contact the touch screen. The first parameter value at that instant, i.e., at instant T1 is obtained in the embodiment.

In step 102, a second parameter value of the touch screen is obtained at instant T2 after instant T1.

Figure 2:
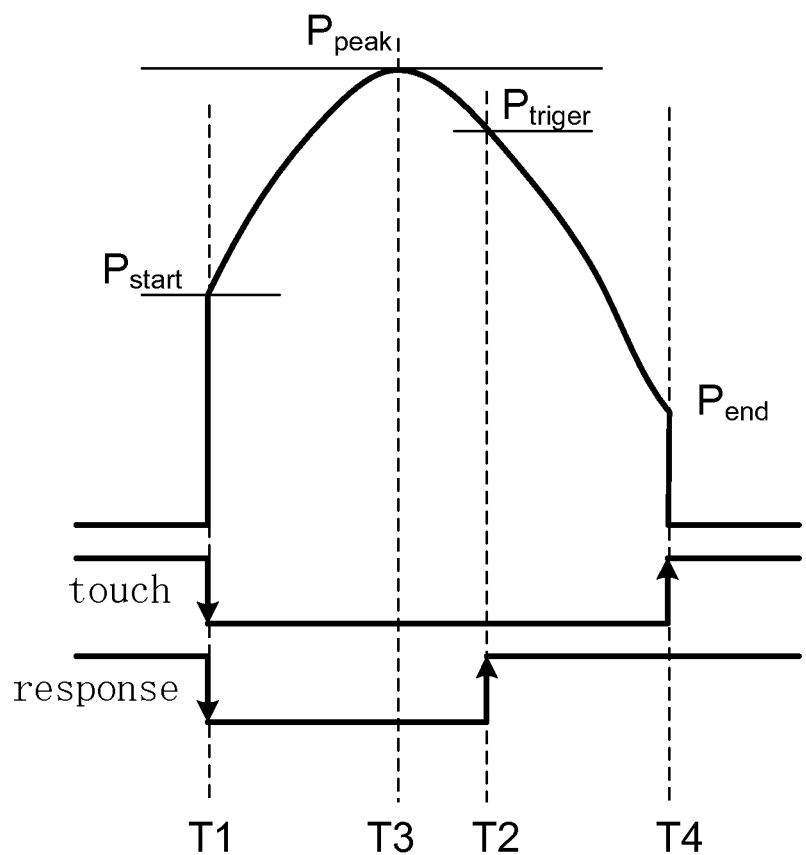
FIG. 2 is a schematic diagram of an application example according to an embodiment of the disclosure.

An instant T3 is defined between instant T1 and instant T2, and the instant T3 corresponds to a third parameter value of the touch screen, where the third parameter value is greater than or equal to the first parameter value and any one of parameter values corresponding to instants between instant T1 and instant T2. As shown in FIG. 2, in a chronological order, the first parameter value Pstart, the third parameter value Ppeak, the second parameter value Ptriger and other intermediate parameter values form a parabola-shaped curve, and the third parameter value is at a vertex of the parabola-shaped curve.

In step 103, an operation response instruction is generated in a case that the second parameter value is greater than a first preset parameter value and a correspondence among the first parameter value, the second parameter value and the third parameter value meets a preset condition.

That is, during pressing down the touch screen by finger, the parameter value of the touch screen is continuously detected. For example, the parameter value may be detected every predetermined detection period, and the detection result is analyzed to determine whether the parameter value is a maximum value, that is the third parameter value at instant T3 is detected and acquired, and instant T3 is the instant when the finger presses down to a lowest point relative to the touch screen during pressing down the touch screen by finger. After instant T3, the parameter value of the touch screen is continuously detected until the detected second parameter value, the first parameter value and the third parameter value meet the corresponding condition, and the operation response is performed. That is, during lifting the finger from the lowest point, according to the embodiment, there is instant T2 corresponding to the second parameter value greater than a first preset parameter value, and at instant T2, the second parameter value is obtained, and the correspondence among the first parameter value, the second parameter value and the third parameter value meets the preset condition, and the operation response instruction is generated, thereby achieving the operation response to the click by finger on the touch screen.

According to above description of the technical solutions, in the information processing method according to the first embodiment of the disclosure, the first parameter value of the touch screen at instant T1 is obtained, the second parameter value of the touch screen is obtained at instant T2, and the instant T3 is defined at which the corresponding third parameter value is greater than parameter values at any other instants between instant T1 and instant T2, and the operation response instruction can be generated in a case that the second parameter value is greater than the first preset parameter value and the correspondence among the first parameter value, the second parameter value and the third parameter value meets the preset condition. According to the embodiment, the operation response to the click is performed before the finger is lifted off the touch screen, and the operation response instruction is generated as long as it is determined that the touch parameter value of the touch screen of the electronic apparatus meets the preset condition, thereby increasing the response speed and improving the user experience.

In a specific implementation, the preset condition may include that: a ratio of a first difference between the third parameter value and the second parameter value to a second difference between the third parameter value and the first parameter value is greater than a preset threshold. The threshold may be set to a value in a range between 0.1 and 0.8. That is, in the embodiment, the operation response instruction may be generated to achieve the operation response for the click operation by finger on the touch screen, in a case that the ratio between the first difference and the second difference is less than the threshold, for example, as shown in FIG. 2, (Ppeak−Ptriger)/(Ppeak−Pstart)>K(K∈(0.1,0.8)). In the embodiment, the operation response may be performed before the finger is separated from the touch screen completely, that is, before an end-point parameter value corresponding to instant T4 is obtained, therefore the response speed is increased.

Furthermore, when the touch screen is clicked by the finger, in a case that the third parameter value is equal to the first parameter, that is, instant T1 is instant T3, and the parameter value corresponding to instant T1 is equal to the parameter value corresponding to instant T3, the preset condition may include that: a ratio of a first difference between the third parameter value and the second parameter value to the third parameter value is greater than a preset threshold, that is, a ratio between the first difference and the third parameter is greater than the preset threshold. That is in a case that the ratio between the first difference and the third parameter is greater than the preset threshold, for example, as shown in FIG. 2, (Ppeak−Ptriger)/Ppeak>K(K∈ (0.1,0.8)), the operation response instruction may be generated, and the operation response to the click by finger on the touch screen may be performed.

Figure 3:
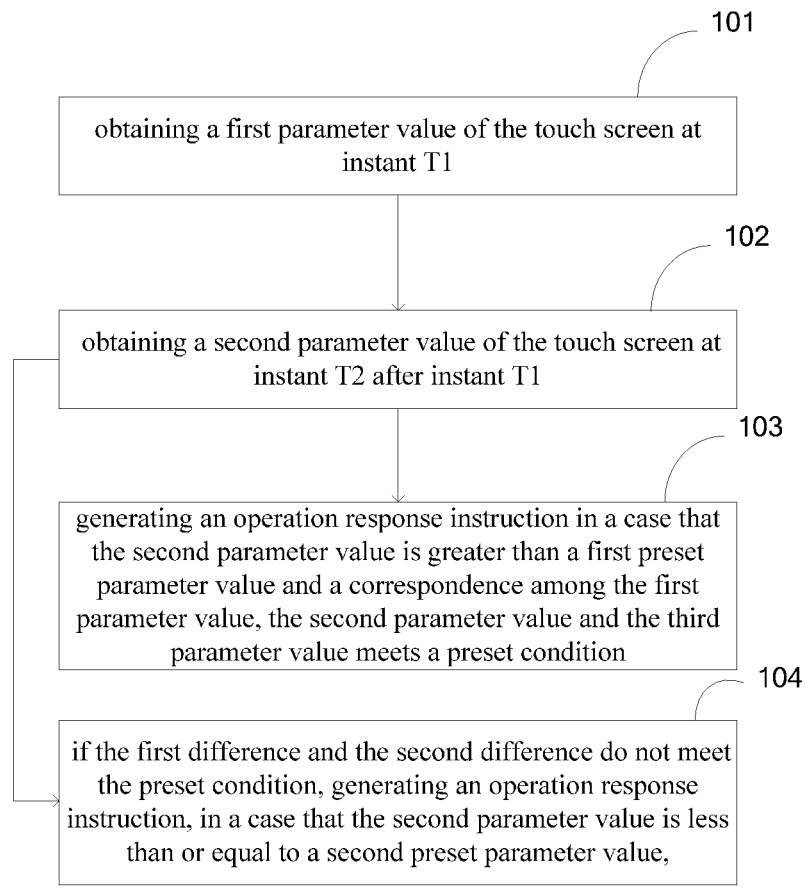
FIG. 3 is a flow chart of an information processing method according to a second embodiment of the disclosure.

On the basis of above embodiments, in a case that after the maximum value, i.e., the third parameter value is detected at instant T3, the parameter value of the touch screen is continually detected until the parameter value changes to minimum value Pend corresponding to instant T4, and then rapidly decreases to 0, and the first parameter value, the third parameter value and a newly detected parameter value still do not meet the preset condition, the operation response may still be performed in the embodiment. FIG. 3 shows a flow chart of an information processing method according to a second embodiment of the disclosure, and after step 102, the method may further include step 104.

In step 104, if the first difference and the second difference do not meet the preset condition, an operation response instruction is generated to achieve the operation response to the click by finger on the touch screen, in a case that the second parameter value is less than or equal to a second preset parameter value.

For example, as shown in FIG. 2, the operation response may still be performed if the preset condition is not met in a case that the second parameter value corresponding to instant T2 is equal to the minimum value Pend (instant T4).

In a practical application, the parameter values of the touch screen such as the first parameter value, the second parameter value and the third parameter value may be a variation value of capacitance, a value of contact area, or a variation value of contact pressure in relation to the touch screen.

That is, in the embodiment, a corresponding parameter value may be obtained through disposing a capacitive sensor, a touch sensor or a pressure sensor on the touch screen.

It should be noted that, the variation value of capacitance of the touch screen may be a sum of variation values of capacitance sensors tiled on the touch sensor, and the variation value of contact pressure on the touch screen may be a sum of variation values of contact pressure from pressure sensors tiled on the touch screen.

Figure 4:
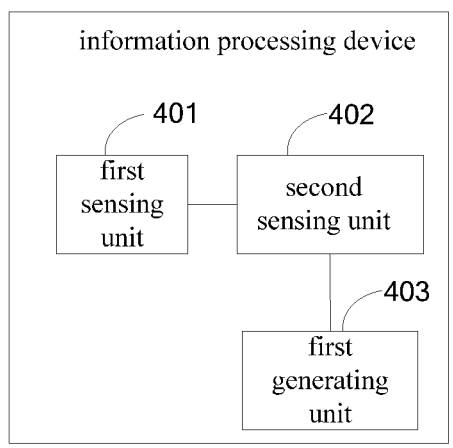
FIG. 4 is a schematic structural diagram of an information processing device according to a third embodiment of the disclosure.

FIG. 4 shows a schematic structural diagram of an information processing device according to a third embodiment of the disclosure. The information processing device is applicable to an electronic apparatus which may be a terminal apparatus provided with a touch screen such as a mobile phone, a pad, or a laptop, and the device may include the following units 401 to 403.

A first sensing unit 401 is configured to obtain a first parameter value of the touch screen at instant T1.

That is, during a click operation of a user by finger on the touch screen, the first parameter value of the touch screen is generated at an instant when the finger contacts the touch screen. The first parameter value at that instant, i.e., instant T1 is obtained in the embodiment.

A second sensing unit 402 is configured to obtain a second parameter value of the touch screen at instant T2 after instant T1.

An instant T3 is defined between instant T1 and instant T2, and the instant T3 corresponds to a third parameter value, where the third parameter value is greater than or equal to the first parameter value and any one of parameter values corresponding to instants between instant T1 and instant T2. As shown in FIG. 2, in a chronological order, the first parameter value Pstart, the third parameter value Ppeak, the second parameter value Ptriger and other intermediate parameter values form a parabola-shaped curve, and the third parameter value is at a vertex of the parabola-shaped curve.

A first generating unit 403 is configured to generate an operation response instruction in a case that the second parameter value is greater than a first preset parameter value and a correspondence among the first parameter value, the second parameter value and the third parameter value meets a preset condition.

That is, during pressing down the touch screen by finger, the parameter value of the touch screen is continuously detected. For example, the parameter value may be detected every predetermined detection period, and the detection result is analyzed to determine whether the parameter value is a maximum value, that is the third parameter value at instant T3 is detected and acquired, and instant T3 is the instant when the finger presses down to a lowest point relative to the touch screen during pressing down the touch screen by finger. After instant T3, the parameter value of the touch screen is continuously detected until the detected second parameter value, the first parameter value and the third parameter value meet the corresponding condition, and the operation response is performed. That is, during lifting the finger from the lowest point, according to the embodiment, there is instant T2 corresponding to the second parameter value greater than a first preset parameter value, and at instant T2, the second parameter value is obtained and the correspondence among the first parameter value, the second parameter value and the third parameter value meets the preset condition, and the operation response instruction is generated, thereby achieving the operation response to the click by finger on the touch screen.

According to above description of the technical solutions, the information processing device according to the third embodiment of the disclosure, obtains the first parameter value of the touch screen at instant T1, obtains the second parameter value of the touch screen at instant T2, and there is instant T3 at which the corresponding third parameter value is greater than parameter values at any other instants between instant T1 and instant T2, and the operation response instruction can be generated in a case that the second parameter value is greater than the first preset parameter value and the correspondence among the first parameter value, the second parameter value and the third parameter value meets the preset condition. According to the embodiment, the operation response to the click is performed before the finger is lifted off the touch screen, and the operation response instruction is generated as long as it is determined that the touch parameter value of the touch screen of the electronic apparatus meets the preset condition, thereby increasing the response speed and improving the user experience.

In a specific implementation, the preset condition may include that: a ratio of a first difference between the third parameter value and the second parameter value to a second difference between the third parameter value and the first parameter value is greater than a preset threshold. The threshold may be set to a value in a range between 0.1 and 0.8. That is, in the embodiment, the operation response instruction may be generated to achieve the operation response for the click operation by finger on the touch screen, in a case that the ratio between the first difference and the second difference is less than the threshold, for example, as shown in FIG. 2, (Ppeak−Ptriger)/(Ppeak−Pstart)>K(K∈(0.1,0.8)). In the embodiment, the operation response may be performed before the finger is separated from the touch screen completely, that is, before an endpoint parameter value corresponding to instant T4 is obtained, therefore the response speed is increased.

Furthermore, when the touch screen is clicked by the finger, in a case that the third parameter value is equal to the first parameter, that is, instant T1 is instant T3, and the parameter value corresponding to instant T1 is equal to the parameter value corresponding to instant T3, the preset condition may include that: a ratio of a first difference between the third parameter value and the second parameter value to the third parameter value is greater than a preset threshold, that is, a ratio between the first difference and the third parameter is greater than a preset threshold. That is in a case that the ratio between the first difference and the third parameter is greater than the preset threshold, for example, as shown in FIG. 2, (Ppeak−Ptriger)/Ppeak>K(K∈(0.1,0.8)), the operation response instruction may be generated, and the operation response to the click by finger on the touch screen may be performed.

Figure 5:
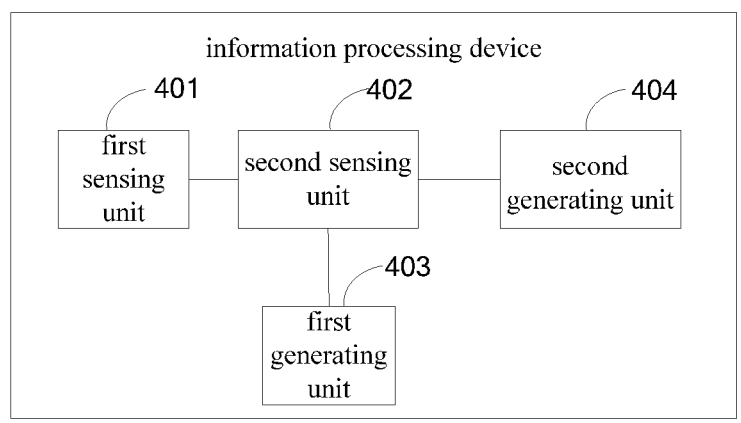
FIG. 5 is a schematic structural diagram of an information processing device according to a fourth embodiment of the disclosure.

On the basis of above embodiments, in a case that after the maximum value, i.e., the third parameter value is detected at instant T3, the parameter value of the touch screen is continually detected until the parameter value changes to minimum value Pend corresponding to instant T4, and then rapidly decreases to 0, and the first parameter value, the third parameter value and a newly detected parameter value still do not meet the preset condition, the operation response may still be performed in the embodiment. FIG. 5 shows a flow chart of an information processing device according to a forth embodiment of the disclosure, and the device may further include a second generating unit 404.

If the first difference and the second difference do not meet the preset condition, the second generating unit 404 is configured to generate an operation response instruction in a case that the second parameter value is less than or equal to a second preset parameter value.

For example, as shown in FIG. 2, the operation response may still be performed if the preset condition is not met in a case that the second parameter value corresponding to instant T2 is equal to the minimum value Pend (instant T4).

In a practical application, the parameter values of the touch screen such as the first parameter value, the second parameter value and the third parameter value may be variation values of capacitance of the touch screen, values of contact area of the touch screen and variation values of contact pressure the touch screen.

That is, in the embodiment, a corresponding parameter value may be obtained through disposing a capacitive sensor, a touch sensor or a pressure sensor provided on the touch screen.

It should be noted that, the variation value of capacitance of the touch screen may be a sum of variation values of capacitance sensors tiled on the touch sensor, and the variation value of contact pressure on the touch screen may be a sum of variation values of contact pressure from pressure sensors tiled on the touch screen.

Figure 6:
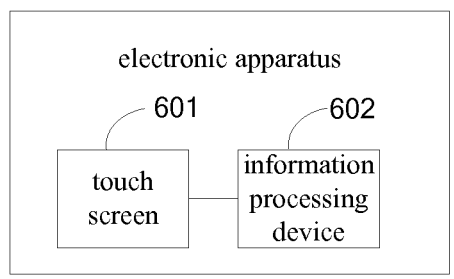
FIG. 6 is a schematic structural diagram of an electronic apparatus according to a fifth embodiment of the disclosure.

FIG. 6 shows a schematic structural diagram of an electronic apparatus according to a fifth embodiment of the disclosure. The electronic apparatus may be a terminal apparatus provided with a touch screen 601 such as a mobile phone, a pad, or a laptop. The electronic apparatus may include an information processing device 602 according to any one of the above embodiments.

The information processing device 602 is configured to obtain a first parameter value of the touch screen at instant T1; obtain a second parameter value of the touch screen at instant T2 after instant T1, where an instant T3 is defined between instant T1 and instant T2, and the instant T3 corresponds to a third parameter value, where the third parameter value is greater than or equal to the first parameter value and any one of parameter values corresponding to instants between instant T1 and instant T2; and generate an operation response instruction in a case that the second parameter value is greater than a first preset parameter value and a correspondence among the first parameter value, the second parameter value and the third parameter value meets a preset condition.

Specifically, the implementing structure and implementing way of the information processing device 602 may refer to the description in the above embodiments, and are not be described in detail herein.

The embodiments of the present disclosure are described herein in a progressive manner, and each embodiment places emphasis on the difference from other embodiments, therefore one embodiment can refer to other embodiments for the same or similar parts.

It should be noted that, a relationship term such as "the first" and "the second" herein is only used to distinguish one entity or operation from another entity or operation, and does not necessarily acquire or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

The information processing method, the information processing device and the electronic apparatus according to the embodiments of the disclosure are described in detail above, the principles and implementing ways of the disclosure are illustrated by specific examples in the disclosure, and the above illustration of the embodiments is only used to help understanding the disclosure and the core idea thereof. In addition, those skilled in the art can make modifications to the specific embodiments and the application scope based on the idea of the disclosure. Therefore, the specification of the disclosure should not be understood as limitations to the disclosure.

What is claimed is:

1. An information processing method comprising:
   detecting, by a sensor of an electronic apparatus, a parameter of a touch screen of the electronic apparatus every predetermined detection period;
   obtaining, by the electronic apparatus, a first value of the parameter of the touch screen of the electronic apparatus at instant T1, wherein a finger is separated from the touch screen before instant T1, and touches the touch screen at instant T1;
   obtaining, by the electronic apparatus, a second value of the parameter of the touch screen at instant T2 after instant T1, wherein an instant T3 is defined between instant T1 and instant T2, the instant T3 corresponds to a third value of the parameter of the touch screen, wherein the third value is the maximum value of the parameter during a period between instant T1 and instant T2, wherein at instants T2 and T3, the finger touches the touch screen; and
   performing, by the electronic apparatus, an operation in response to determining that a ratio of a first difference between the third value and the second value to a second difference between the third value and the first value is greater than a first preset threshold, wherein the second value is greater than a first preset value.

2. The method according to claim 1, wherein, in a case that the third value is equal to the first value,
   performing, by the electronic apparatus, an operation in response to determining that a ratio of the first difference between the third value and the second value to the third value is greater than a second preset threshold.

3. The method according to claim 1, wherein, if the ratio of the first difference between the third value and the second value to the second difference between the third value and the first value is less than the first preset threshold, the method further comprises:
   performing, by the electronic apparatus, the operation in response to determining that the second parameter value is less than or equal to a second preset value.

4. The method according to claim 1, wherein the value of the parameter comprises a variation value of capacitance, a value of contact area, or a variation value of contact pressure in relation to the touch screen.

5. An information processing device, comprising:
   a sensor configured to detect a parameter of a touch screen of the information processing device every predetermined detection period;
   a first sensing unit configured to obtain a first value of the parameter of the touch screen at instant T1, wherein a finger is separated from the touch screen before instant T1, and touches the touch screen at instant T1;
   a second sensing unit configured to obtain a second value of the parameter of the touch screen at instant T2 after instant T1, wherein an instant T3 is defined between instant T1 and instant T2, the instant T3 corresponds to a third value of the parameter, wherein the third value is the maximum value of the parameter during a period between instant T1 and instant T2, wherein at instants T2 and T3, the finger touches the touch screen; and
   a first generating unit configured to perform an operation in response to determining that a ratio of a first difference between the third value and the second value to a second difference between the third value and the first value is greater than a first preset threshold, wherein the second value is greater than a first preset value.

6. The device according to claim 5, wherein, the first generating unit is configured to, in a case that the third value is equal to the first value, perform an operation in response to determining that a ratio of the first difference between the third value and the second value to the third value is greater than a second preset threshold.

7. The device according to claim 5, wherein, the device further comprises:
   a second generating unit configured to perform the operation in response to determining that the second parameter value is less than or equal to a second preset value if the ratio of the first difference between the third value and the second value to the second difference between the third value and the first value is less than the first preset threshold.

8. The device according to claim 5, wherein the value of the parameter comprises a variation value of capacitance, a value of contact area, or a variation value of contact pressure in relation to the touch screen.

9. An electronic apparatus comprising:
   a touch screen;
   a sensor configured to detect a parameter of the touch screen every predetermined detection period;
   a sensing unit configured to:
   obtain a first value of the parameter of the touch screen at instant T1, wherein a finger is separated from the touch screen before instant T1, and touches the touch screen at instant T1;
   obtain a second value of the parameter of the touch screen at instant T2 after instant T1, wherein an instant T3 is defined between instant T1 and instant T2, and instant T3 corresponds to a third value, wherein the third value is the maximum value of the parameter during a period between instant T1 and instant T2, wherein at instants T2 and T3, the finger touches the touch screen; and
   a processor configured to perform an operation in response to determining that a ratio of a first difference between the third value and the second value to a second difference between the third value and the first value is greater than a first preset threshold, wherein the second value is greater than a first preset value.

10. The electronic apparatus according to claim 9, wherein, the processor is further configured to perform an operation in response to determining that a ratio of the first difference between the third value and the second value to the third value is greater than a second preset threshold in a case that the third value is equal to the first value.

11. The electronic apparatus according to claim 9, wherein, the processor is further configured to perform the operation in response to determining that the second parameter value is less than or equal to a second preset value if the ratio of the first difference between the third value and the second value to the second difference between the third value and the first value is less than the first preset threshold.

12. The electronic apparatus according to claim 9, wherein the value of the parameter comprises a variation value of capacitance, a value of contact area, or a variation value of contact pressure in relation to the touch screen.

* * * * *